(12) United States Patent
Langlois

(10) Patent No.: US 8,973,797 B2
(45) Date of Patent: Mar. 10, 2015

(54) FOLDABLE BICYCLE PANNIER

(71) Applicant: Damon Langlois, Victoria (CA)

(72) Inventor: Damon Langlois, Victoria (CA)

( * ) Notice: Subject to any disclaimer, the term of this patent is extended or adjusted under 35 U.S.C. 154(b) by 0 days.

(21) Appl. No.: 14/087,817

(22) Filed: Nov. 22, 2013

(65) Prior Publication Data

US 2014/0138417 A1    May 22, 2014

Related U.S. Application Data

(60) Provisional application No. 61/729,401, filed on Nov. 22, 2012.

(51) Int. Cl.
*B62J 9/00*    (2006.01)

(52) U.S. Cl.
CPC ... *B62J 9/001* (2013.01); *B62J 9/00* (2013.01)
USPC ........................................................ 224/432

(58) Field of Classification Search
CPC ........ B62J 9/00; A45C 7/0077; A45C 7/0059
USPC ......... 224/432, 428, 429, 430, 431, 436, 437, 224/438; 190/107
See application file for complete search history.

(56) References Cited

U.S. PATENT DOCUMENTS

| | | | | |
|---|---|---|---|---|
| 2,479,824 A * | 8/1949 | Fass | | 383/2 |
| 3,813,018 A * | 5/1974 | Heltzen | | 224/432 |
| 3,934,770 A * | 1/1976 | Larsen | | 224/429 |
| 3,995,803 A * | 12/1976 | Uitz | | 224/432 |
| 4,662,548 A | 5/1987 | Jackson et al. | | |
| 5,484,090 A | 1/1996 | Lyshkov | | |
| 5,797,529 A * | 8/1998 | Lavine | | 224/575 |
| 5,904,230 A * | 5/1999 | Peterson | | 190/107 |
| 7,582,047 B2 * | 9/2009 | Madson | | 493/214 |
| 7,682,080 B2 * | 3/2010 | Mogil | | 383/110 |
| 8,016,090 B2 * | 9/2011 | McCoy et al. | | 190/107 |
| 8,209,995 B2 * | 7/2012 | Kieling et al. | | 62/457.1 |
| 8,322,583 B2 * | 12/2012 | Crum et al. | | 224/432 |
| 2004/0001653 A1 * | 1/2004 | Coval Carr et al. | | 383/111 |

FOREIGN PATENT DOCUMENTS

WO    WO2013044252 A9 *    3/2013    ................. B62J 9/00

* cited by examiner

*Primary Examiner* — Justin Larson
(74) *Attorney, Agent, or Firm* — Klarquist Sparkman, LLP

(57) ABSTRACT

A folding pannier suitable for carrying a for accommodating a generally rectangular recyclable paper, or re-useable, grocery bag. The pannier manipulable between an expanded configuration and a folded configuration. The pannier featuring fasteners for use in securing a cover when in the expanded configuration and in securing the pannier in the folded configuration.

6 Claims, 7 Drawing Sheets

FOLDABLE BICYCLE PANNIER

CROSS REFERENCE TO RELATED APPLICATIONS

This application claims the benefit of U.S. Provisional Patent Application No. 61/729,401 (FOLDABLE BICYCLE PANNIER), filed 22 Nov. 2012.

FIELD OF THE INVENTION

The present invention relates to the field of bags and panniers mountable on bicycles.

BACKGROUND OF THE INVENTION

The ever growing popularity of cycling both on roads and off, for pleasure and commuting has brought about a large demand for ways to carry various items while riding a bicycle. The best method to carry a medium to large sized load on a bicycle is through the use of panniers (saddle type bags) attached to rear or front racks mounted to the bicycle.

In a modem urban environment the bicycle is often used for carrying groceries; however. existing rear-mounted panniers are not well adapted to carrying groceries because they are not properly sized or shaped to accommodate generally rectangular recyclable paper grocery bag and reusable grocery bag. Most existing pannier systems rely on a soft-sided carrying bag having a cinch closure. This is not an efficient shape to carry food items which are contained in rectangular containers.

The known bag-type panniers tend to be not high enough to accommodate a single grocery bag. The cinch type closure of the existing bag-type pannier closure is not well suited to protecting food items and may results in softer food items being crushed. As well, existing bag-type panniers do not readily fold or collapse into a smaller profile when empty.

Hard-sided panniers that take the shape of boxes mounted in a saddletype configuration are also known. These box-type panniers retain a rigid structure at all times and do not collapse into a smaller profile when empty. Therefore there is a need for a pannier system that is able to readily accommodate a generally-rectangular grocery bag, so as to avoid having to repack the groceries into the pannier.

SUMMARY OF THE INVENTION

In one aspect, the present invention provides a bicycle pannier for mounting on a bicycle. The bicycle pannier is frameless and has a first folded configuration and a second expanded configuration.

The pannier comprises a front panel and a rear panel comprising a first, second and third intersecting folding lines that intersect proximate to a pannier bottom surface. The first, second and third intersecting folding lines permit expansion of the front panel and the rear panel from the first folded configuration to the second expanded configuration. The pannier has a bottom surface comprising a first panel in the first folded configuration and a combined first panel and second panel in the second expanded configuration. The combined panels are separated by a fourth folding line. The pannier includes an inside wall panel adjacent to the bicycle and an outside wall panel. In the folded configuration the outside wall panel comprises a third panel and the second panel folded upwards over said third panel. In the expanded configuration the outside wall comprises the third panel, a fourth panel and a fifth panel. The third panel and the fourth panel are separated by a fifth folding line and the fourth panel and the fifth panel are separated by a sixth folding line. The pannier is closed by a side closure flap. In the folded configuration the side closure flap comprises a sixth panel and a seventh panel separated by a seventh folding line. In the expanded configuration comprises only the seventh panel comprises the side closure flap. The pannier top closure surface in the folded configuration comprises a top panel. In the expanded configuration the top closure surface comprises the top panel and the sixth panel separated by an eighth folding line. A first set of fasteners secures the side closure flap when in the folded configuration and a second set of fasteners secures the side closure flap when in the expanded configuration.

In another aspect, the present invention provides a bicycle pannier including: a generally rectangular inner panel having mounting features for use in mounting the pannier to a bicycle, and having an upper edge, forward edge, rearward edge and lower edge; a generally rectangular bottom panel hingedly attached to the inner panel lower edge; a generally rectangular outer panel having a top and hingedly attached to the bottom panel opposite the attachment between the bottom panel and the inner panel, and foldable at an outer panel fold, the outer panel fold generally parallel to the attachment between the outer panel and the bottom panel, wherein the distance between the outer panel fold and the attachment between the outer panel and the bottom panel is no greater than the distance between the attachment between the outer panel and the bottom panel, and the attachment between the inner panel and the bottom panel; a closure panel hingedly attached to the inner panel upper edge and foldable at a closure panel fold, the closure panel fold generally parallel to the attachment between the closure panel and the inner panel; a generally rectangular flexible rearward panel attached to the inner panel rearward edge and to adjacent edges of the bottom panel and outer panel; a generally rectangular flexible forward panel attached to the inner panel forward edge and to adjacent edges of the bottom panel and outer panel; wherein the pannier is manipulable between: an expanded configuration in which: the inner panel, bottom panel, outer panel, rearward panel and forward panel define the bottom and four sides of a generally rectangular containment volume; the portion of the closure panel between the attachment between the closure panel and the inner panel, and the closure panel fold, defines a cover for the containment volume; and the portion of the closure panel between the closure panel fold and an opposite distal end of the closure panel overlies a portion of the outer panel; and a folded configuration in which the bottom panel is hinged towards the inner panel; the outer panel is hinged at the attachment between the outer panel and the bottom panel, and folded at the outer panel fold, so as to interpose between the bottom panel and the inner panel: the portion of the outer panel between the outer panel fold and the attachment between the outer panel and the bottom panel; and a portion of the outer panel between the outer panel fold and the outer panel top.

The pannier may also include a releasable fastener system for releasably securing the pannier in the folded configuration and for releasably securing the cover over the containment volume when the pannier is in the expanded configuration. The releasable fastener system may include: a first fastener component, being a first part of a two-part fastener, affixed to the portion of the closure panel between the closure panel fold and the opposite distal end of the closure panel; a second fastener component, being an instance of the second part of the two-part fastener, affixed to the outer panel, so as to be fastenable to the first fastener component when the pannier is in the expanded configuration; and a third fastener component, being another instance of the second part of the two-part fastener, affixed to the bottom panel, so as to be fastenable to the first fastener component when the pannier is in the folded configuration. The first fastener component may be a grommet and the second and third fastener components may be releasable twist locks configured for mating engagement with the grommet. The two-part fastener may be a snap fastener.

The inner panel may be substantially rigid. The hinged attachment between the inner panel and the bottom panel may be offset from the inner panel. The hinged attachment between the inner panel and the closure panel may be offset from the inner panel.

The outer panel fold may comprise a band of flexible material. The features for use in mounting the pannier to a bicycle may comprise features for releasably securing the pannier to a rack mounted to a bicycle.

DETAILED DESCRIPTION WITH REFERENCE TO THE DRAWINGS

Figure 1:
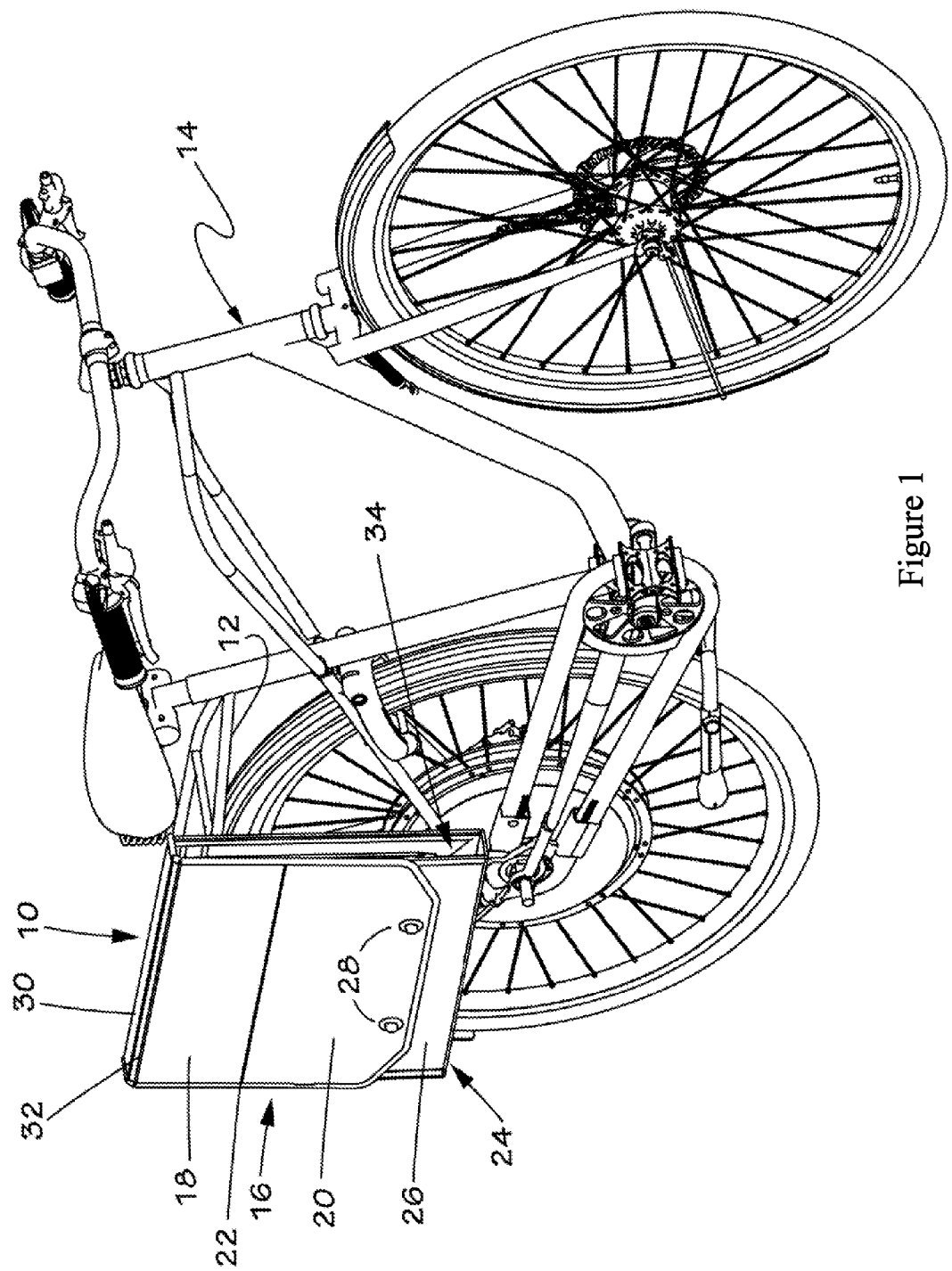
FIG. 1 is a perspective view of the invention in a folded configuration mounted on a bicycle.

Referring to the figures, the invention teaches a bicycle pannier 10 for mounting on a bicycle 14. The bicycle pannier 10 is frameless. The pannier has a first folded configuration shown in FIG. 1 and a second expanded configuration shown in FIG. 2.

The bicycle pannier comprises a front panel 34 and a rear panel 70 comprising a first 72, a second 74 and a third 76 intersecting folding lines that intersect proximate to a pannier bottom surface 23. The first 72, second 74 and third 76 intersecting folding lines permit expansion of the front panel and the rear panel from the first folded configuration to the second expanded configuration.

The pannier bottom 23 surface comprises a first panel 24 in the first folded configuration and the first panel 24 and a second panel 25 in the second expanded configuration. The first panel 24 and the second panel 25 are separated by a fourth folding line 27. There is an inside wall panel 84 adjacent to the bicycle 14. There is an outside wall panel 26 when in the folded configuration comprises a third panel 40 and the second panel 25 folded upwards over the third panel 40. In the expanded configuration the outside wall 26 comprises the third panel 40, a fourth panel 42 and a fifth panel 44 wherein the third panel and said fourth panel are separated by a fifth folding line 43a and the fourth panel and said fifth panel are separated by a sixth folding line 43b.

There is further a side closure flap 16 wherein when in the folded configuration comprises a sixth panel 18 and a seventh panel 20 separated by a seventh folding line 22. In the expanded configuration the side closure flap comprises the seventh panel 20.

There is a top closure surface 54 when in the folded configuration comprises a top panel 30 and when in the expanded configuration comprises the top panel 30 and the sixth panel 18 separated by an eighth folding line 32.

There is a first set of fasteners 28 for securing the side closure flap when in the folded configuration and a second set of fasteners 46 for securing the side closure flap when in the expanded configuration.

Referring now to FIG. 1 there is shown a view of the invention 10 in a folded configuration mounted in a saddle-type mount 12 on a bicycle 14. The invention 10 teaches a frameless construction using a resilient material to retain the desired shape of the pannier 10 in an open and closed configuration. The side closure flap 16 comprises a upper portion 18 and a lower portion 20 separated by a fold line 22 so that the upper portion of the closure flap covers the pannier opening in an open configuration. The side closure flap 16 extends almost to the bottom 24 of the pannier to provide a weather sealed and secure closure to the pannier. The side closure flap can be shorter in other embodiments with strap fasteners extending to the bottom. The side closure flap 16 is fastened to the outside wall 26 of the pannier by a first pair of grommet-type closures 28. It is to be understood that other types of closures can be used such as hook and loop fasteners, zippers and snap fasteners.

The top portion 30 weather seals the mouth of the pannier in its folded configuration. A set of fold lines 32 permits the combined top portion 30 and upper portion 18 of the side closure flap to fold outwards to cover the mouth of the pannier in its open configuration. A front side portion 34 of the pannier is also illustrated in a folded configuration.

Figure 2:
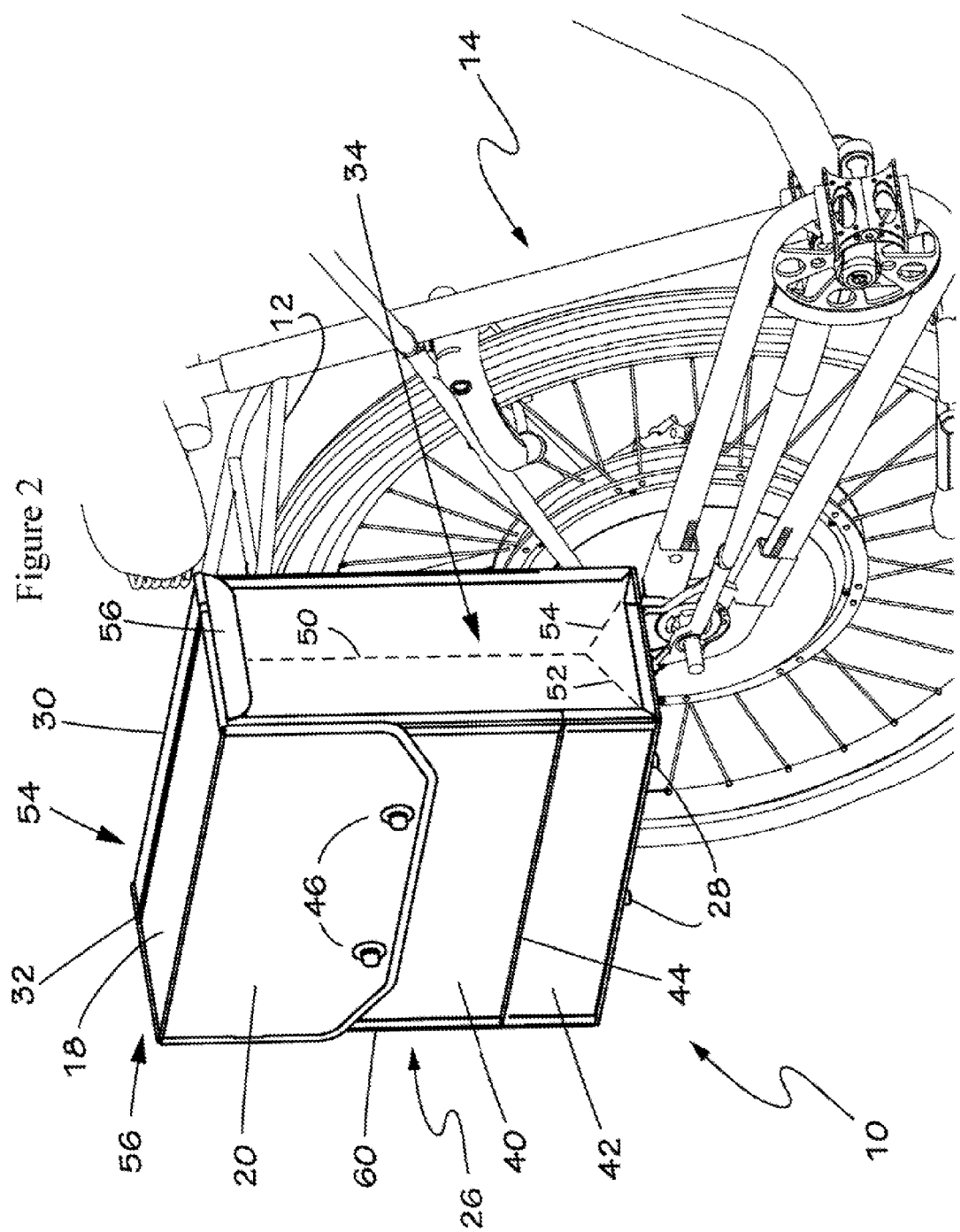
FIG. 2 is a perspective view of the invention shown in FIG. 1 in an expanded configuration mounted on a bicycle.

Referring to FIG. 2, there is shown a view of the invention 10 in an expanded configuration mounted in a saddle-type mount 12 to a bicycle 14. The pannier conveniently expands in a manner that is similar to a grocery bag. The invention teaches that outside wall 26 comprises a sidewall upper portion 40 and a sidewall lower portion 42 separated by a fold line set 44. The first set of grommet-type closures 28 are now disposed along the bottom surface 24 of the open pannier and a second set of grommet-type closures 46 are now rendered visible and operational to secure the lower portion 20 of the side closure flap to the outside wall 26. The front side wall 34 expands along fold lines 50, 52 and 54 to open to full expanded width. Covering the mouth of the open pannier is a top covering 54 resulting from upper portion 18 of the side closure flap 16 and top portion 30 folded flat due to the set of fold lines 30. A pair of weather seal flaps 56 weather seals the gap between the top of the side wall 34 and the top covering 54. Side seams 60 and all other seams of the pannier are reinforced by double stitching and additional fabric.

Figure 3:
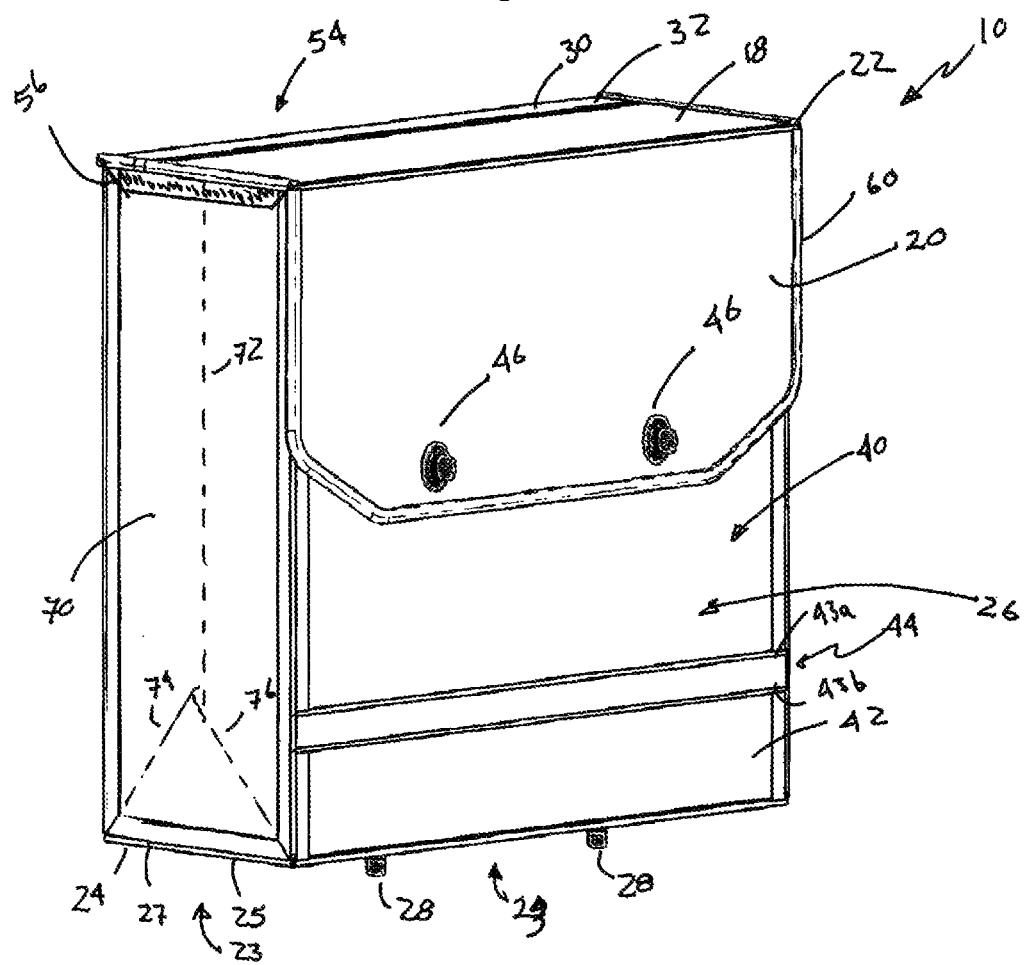
FIG. 3 is a front perspective view of the invention dismounted in an expanded configuration.

Referring now to FIG. 3 there is shown a perspective rear view of the pannier 10 in an expanded configuration. Rear side wall 70 is shown in an expanded configuration along fold lines 72, 74 and 76. Weather sealing flap 56 is illustrated to seal the gap between the top of the side wall 80 and the top cover 54. The top cover 54 comprises the upper portion of the side wall flap 16 folded flat along fold line 32 and combined with top portion 30. The pannier 10 has expanded so that the first set of grommet-type fasteners are now disposed on the bottom surface 24 of the pannier and the second set 46 grommet-type fasteners are now operationally disposed to fasten the lower portion 20 of the side closure flap 16 to the outside wall 26 of the pannier. The outside wall 26 is comprised of the lower portion 42 and the upper portion 40 separate a pair of fold lines 44. All edges 60 of the pannier are reinforced.

Figure 4:
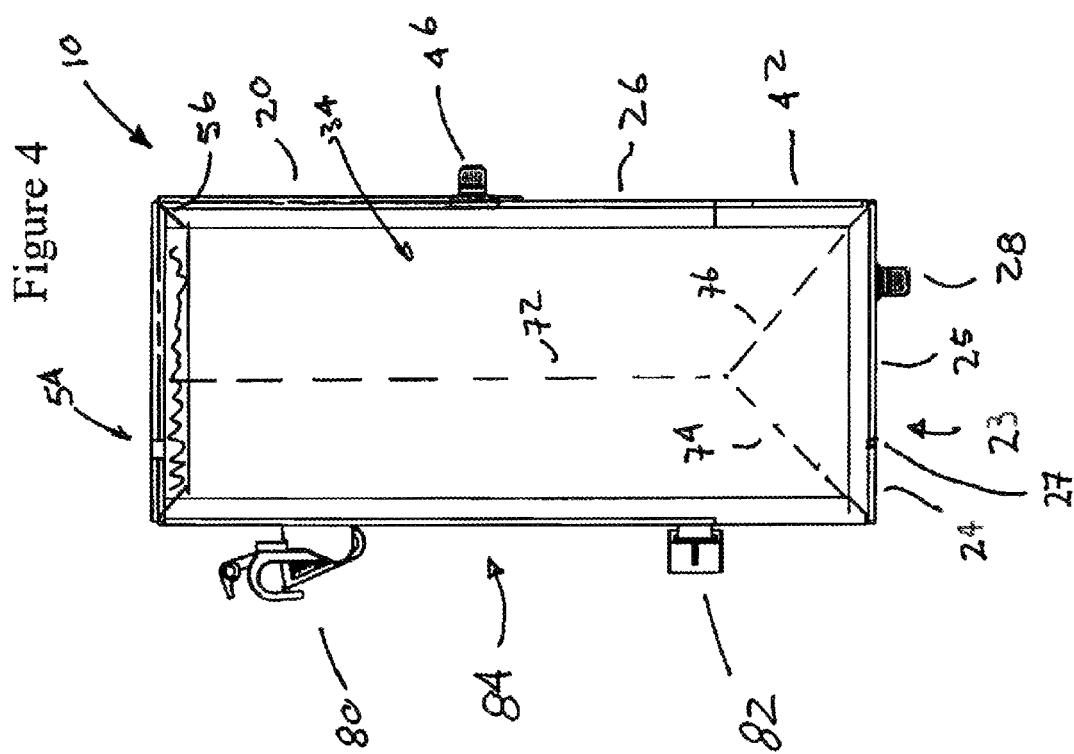
FIG. 4 is a side view of the invention dismounted in an expanded configuration.

Referring now to FIG. 4 there is shown a rear side view of the pannier 10 in an expanded configuration. Upper mounting bracket 80 and lower mounting bracket 82 mount the pannier to the rack 12 shown in FIG. 1. These brackets are permanently mounted to the inside wall 84 of the pannier 10. The following features of the invention 10 illustrated: bottom surface 24; inside wall 84; rear side wall 34 having fold lines 72, 74 and 76; top surface 54 to cover the mouth of the pannier; sealing flap 56, front flap 20; outside wall 26 having a lower portion 42; grommet set 28 disposed on the bottom surface of the expanded pannier and grommet set 46 disposed on the outside wall of the pannier. In the expanded configuration, the bottom surface 23 is comprised of bottom portion 24 and outside wall portion 25 which is folded outwards along fold line 23.

Figure 5:
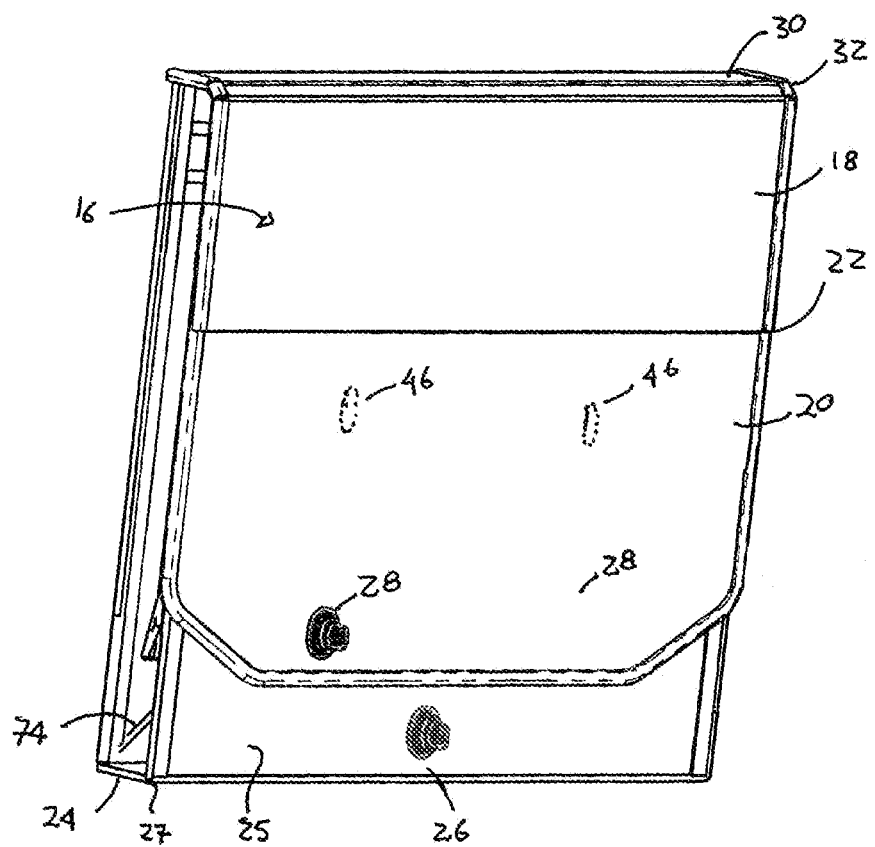
FIG. 5 is a front perspective view of the invention dismounted in a folded configuration.
Figure 6:
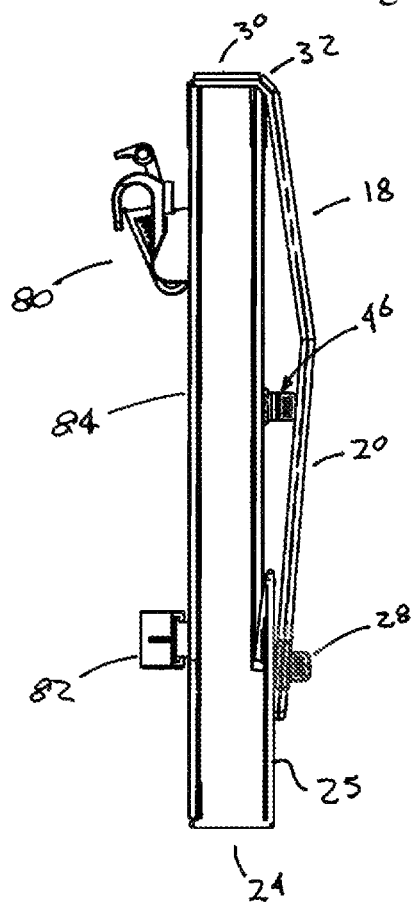
FIG. 6 is a side view of the invention in a folded configuration.

Referring now to FIG. 5 and FIG. 6 there is shown a folded embodiment of the invention 10 dismounted from the bicycle in perspective side view and rear view respectively. The same folded embodiment is shown in FIG. 1 mounted to the bicycle. Grommet closure set 46 is shown disposed beneath the lower portion 20 of the front flap 16. Grommet closure set 28 is illustrated in operation fastening the lower portion 20 of front flap 16 to the outside wall 26 of which lower portion 25 is visible. Top portion 30 and folding lines 32 are also illustrated. The mounting brackets 80 and 82 are shown fixed to the inside surface 80 of the pannier.

Figure 7:
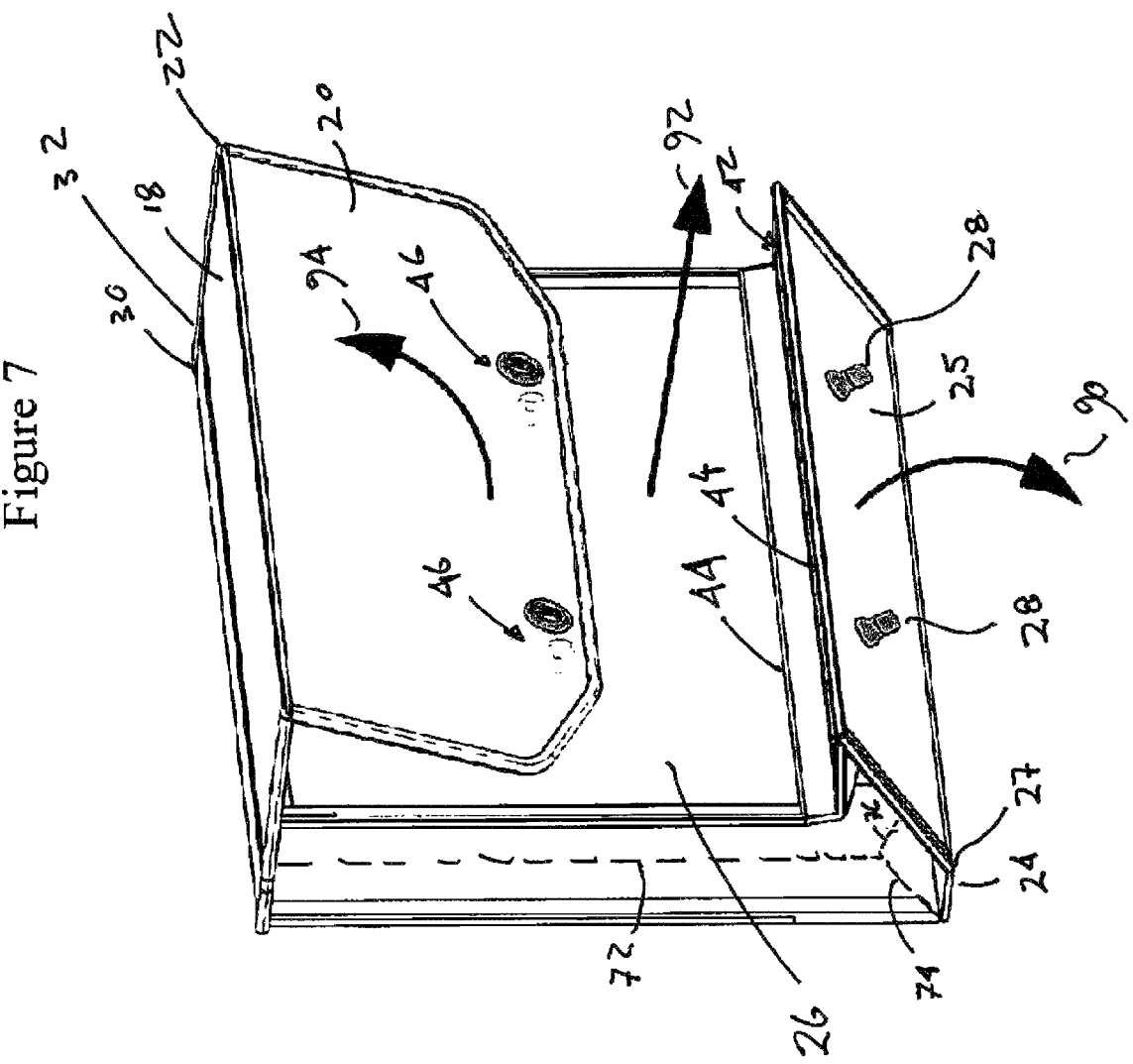
FIG. 7 is a perspective front view of the invention showing how it folds from a folded configuration to an expanded configuration.

Referring now to FIGS. 6 and 7 there is shown the invention moving from a folded configuration in FIG. 6 to an expanded configuration in FIG. 7. Portion 24 combines with portion 25 which folds downwards as shown by arrow 90 along fold line 27 to form the bottom portion 23 of the expanded pannier 10. The fastening grommets 28 are now disposed on the bottom of the pannier. The width of the pannier is expanded as shown by arrow 92 along the fold lines 72, 74 and 76 disposed on side 70. Portion 42 folds outwards along fold lines 44 to increase the height of the pannier sufficient to accommodate a grocery bag. Grommet fastener set 46 is now operational to fasten side portion 20 to the outside wall 26 of the pannier. The upper portion 18 of flap 16 is folded upwards along fold line 32 and 22 as shown by arrow 94. It 10 can be seen that the pannier of the invention is easily folded and unfolded by a simple motion.

While the invention has been described in terms of what is presently considered to be the most practical and preferred embodiments, it is to be understood that the invention need not be limited to the disclosed embodiment. It is intended to cover various modifications and similar arrangements included within the scope of the appended claims which are to be accorded with the broadest interpretation so as to encompass all such modifications and similar structures. For example, the pannier of the invention can be configured to mount on a front rack and on the handle bars of a bicycle.

What is claimed is:

1. A bicycle pannier for mounting on a bicycle, said bicycle pannier being frameless and having a first folded configuration and a second expanded configuration, wherein the bicycle pannier comprises:
    a. a front panel and a rear panel comprising a first, second and third intersecting folding lines that intersect proximate to a pannier bottom surface wherein said first, second and third intersecting folding lines permit expansion of said front panel and said rear panel from said first folded configuration to said second expanded configuration;
    b. said pannier bottom surface comprising a first panel in the first folded configuration and said first panel and a second panel in the second expanded configuration, wherein the first panel and said second panel are separated by a fourth folding line;
    c. an inside wall panel adjacent to said bicycle;
    d. an outside wall panel wherein when in the folded configuration comprises a third panel and the second panel folded upwards over said third panel, and wherein when in the expanded configuration comprises said third panel, a fourth panel and a fifth panel wherein the third panel and said fourth panel are separated by a fifth folding line and the fourth panel and said fifth panel are separated by a sixth folding line;
    e. a side closure flap wherein when in the folded configuration comprises a sixth panel and a seventh panel separated by a seventh folding line and wherein when in the expanded configuration comprises said seventh panel;
    f. a top closure surface wherein when in the folded configuration comprises a top panel and wherein when in the expanded configuration comprises said top panel and said sixth panel separated by an eighth folding line; and,
    g. a first set of fasteners for securing said side closure flap when in the folded configuration and a second set of fasteners for securing the side closure flap when in the expanded configuration.

2. The pannier of claim 1, wherein the first set of fasteners and second set of fasteners share components and together comprise a releasable fastener system comprising
    a first fastener component, being a first part of a two-part fastener, affixed to the portion of the closure panel between the closure panel fold and the opposite distal end of the closure panel;
    a second fastener component, being an instance of the second part of the two-part fastener, affixed to the outer panel, so as to be fastenable to the first fastener component when the pannier is in the expanded configuration; and
    a third fastener component, being another instance of the second part of the two-part fastener, affixed to the bottom panel, so as to be fastenable to the first fastener component when the pannier is in the folded configuration.

3. The pannier of claim 2, wherein the first fastener component is a grommet and the second and third fastener components are releasable twist locks configured for mating engagement with the grommet.

4. The pannier of claim 2, wherein the two-part fastener is a snap fastener.

5. The pannier of claim 1, wherein the inside wall panel is substantially rigid.

6. The pannier of claim 1, further comprising features for releasably securing the pannier to a rack mounted to a bicycle.

* * * * *